United States Patent [19]
Vaughen

[11] 3,908,785
[45] Sept. 30, 1975

[54] AIR CUSHION CONVEYANCES

[76] Inventor: Jack F. Vaughen, 26807 Spring Creek Rd., Palos Verdes Peninsula, Calif. 90274

[22] Filed: Feb. 16, 1972

[21] Appl. No.: 226,729

[52] U.S. Cl. ................................ 180/127; 180/116
[51] Int. Cl.² .......................................... B60V 1/16
[58] Field of Search .......... 180/116, 127, 125, 121, 180/119, 128

[56] References Cited
UNITED STATES PATENTS

| | | | |
|---|---|---|---|
| 3,055,446 | 9/1962 | Vaughen | 180/125 |
| 3,172,494 | 3/1965 | Cockerell | 180/127 |
| 3,266,757 | 8/1966 | Guienne | 180/127 |
| 3,270,827 | 9/1966 | Mantle | 180/116 |
| 3,327,797 | 6/1967 | Bertin | 180/127 |
| 3,330,369 | 7/1967 | Hayward | 180/127 |
| 3,339,657 | 9/1967 | Bertin et al. | 180/127 |
| 3,395,773 | 8/1968 | Duthion et al. | 180/116 |
| 3,493,070 | 2/1970 | Bertin et al. | 180/119 |
| 3,572,461 | 3/1971 | Bertin et al. | 180/127 X |
| 3,587,773 | 6/1971 | Bertin et al. | 180/127 |
| 3,643,758 | 2/1972 | Winter | 180/128 |
| 3,768,588 | 10/1973 | Vaughen | 180/127 |

Primary Examiner—Evon C. Blunk
Assistant Examiner—Joseph E. Valenza
Attorney, Agent, or Firm—George F. Smyth

[57] ABSTRACT

Typically, means to confine an air cushion comprises a sealing assembly which includes an annular inflatable hanger, an annular means cooperative with the floor or ground to minimize air leakage and annular resilient means to suspend the sealing means from the inflatable hanger. Various combinations of prime movers, compressors, and conduit arrangements supply the air cushions and inflate the hangers. A family of concepts pertain to the specific construction of annular sealing assemblies.

18 Claims, 12 Drawing Figures

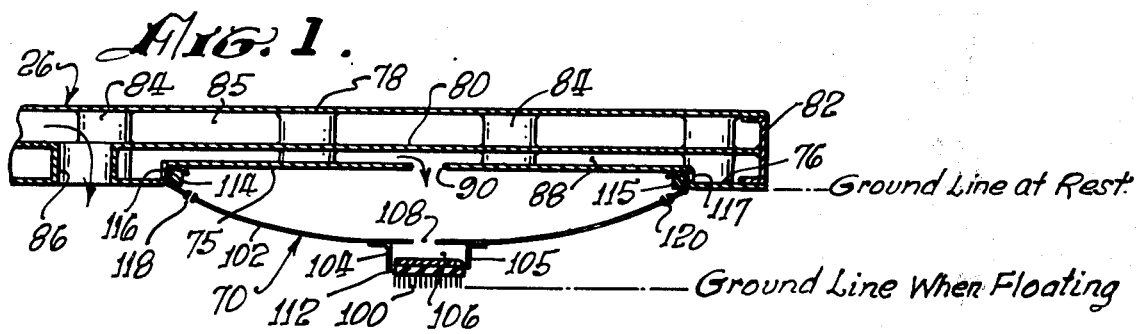

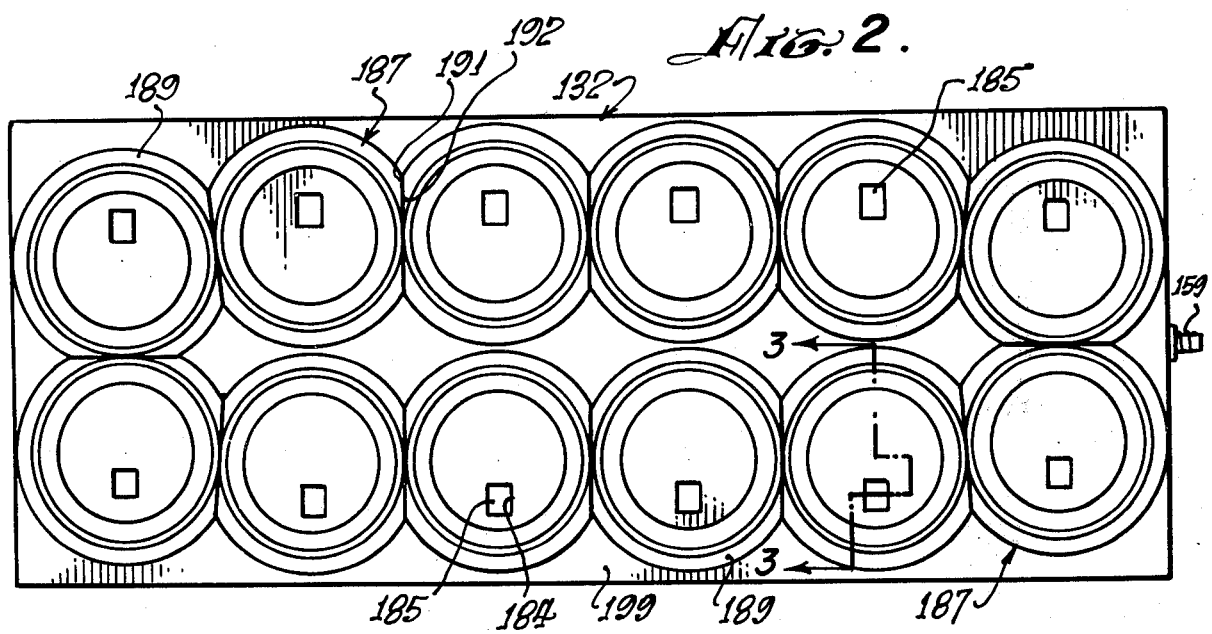

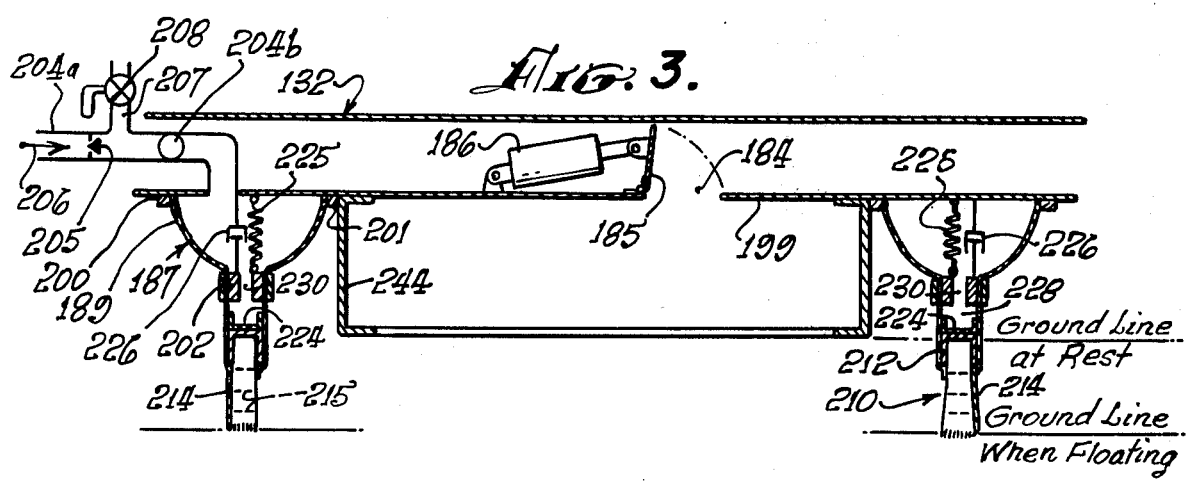
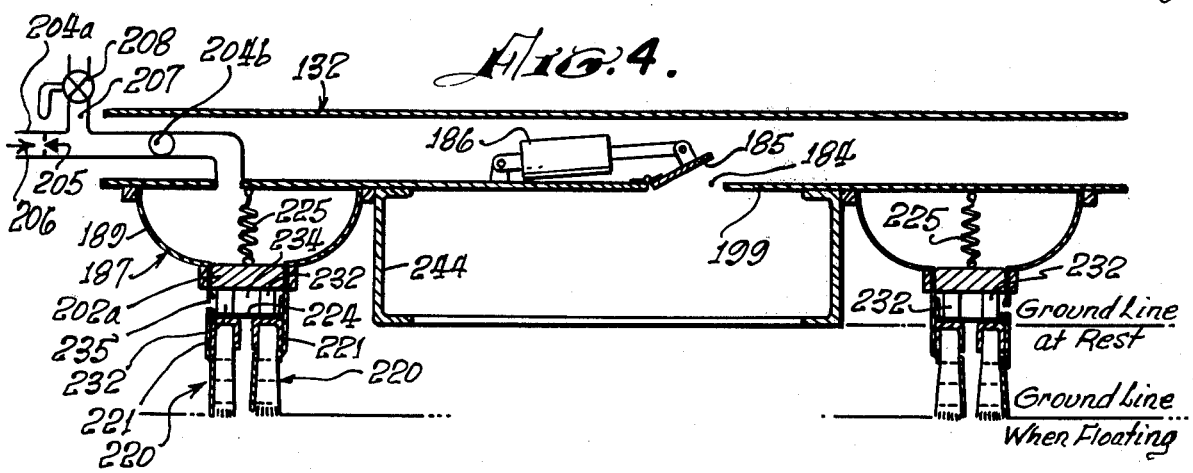
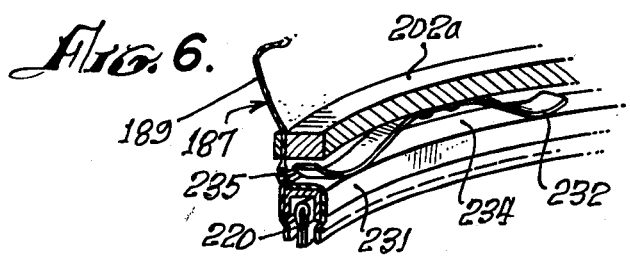
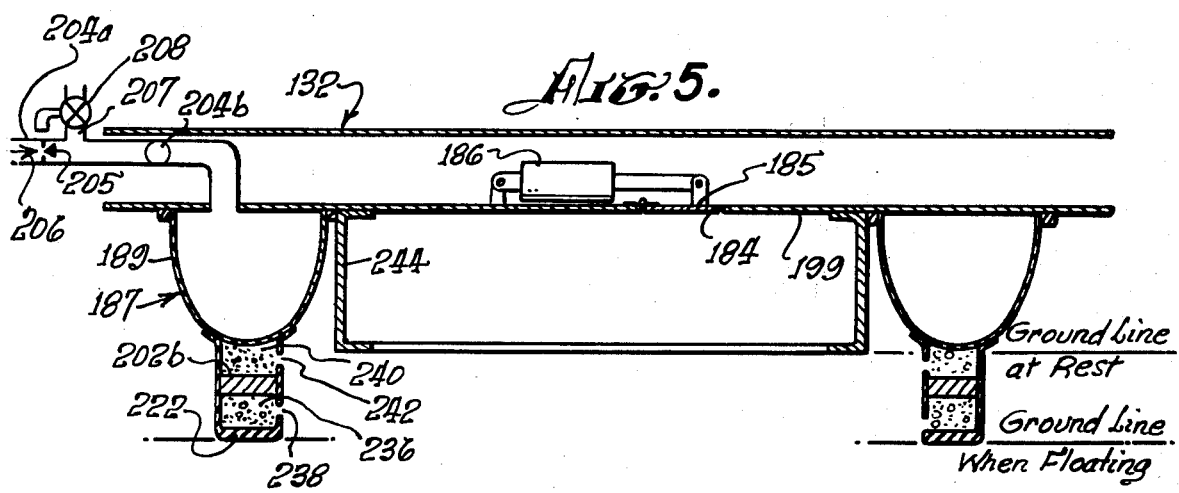

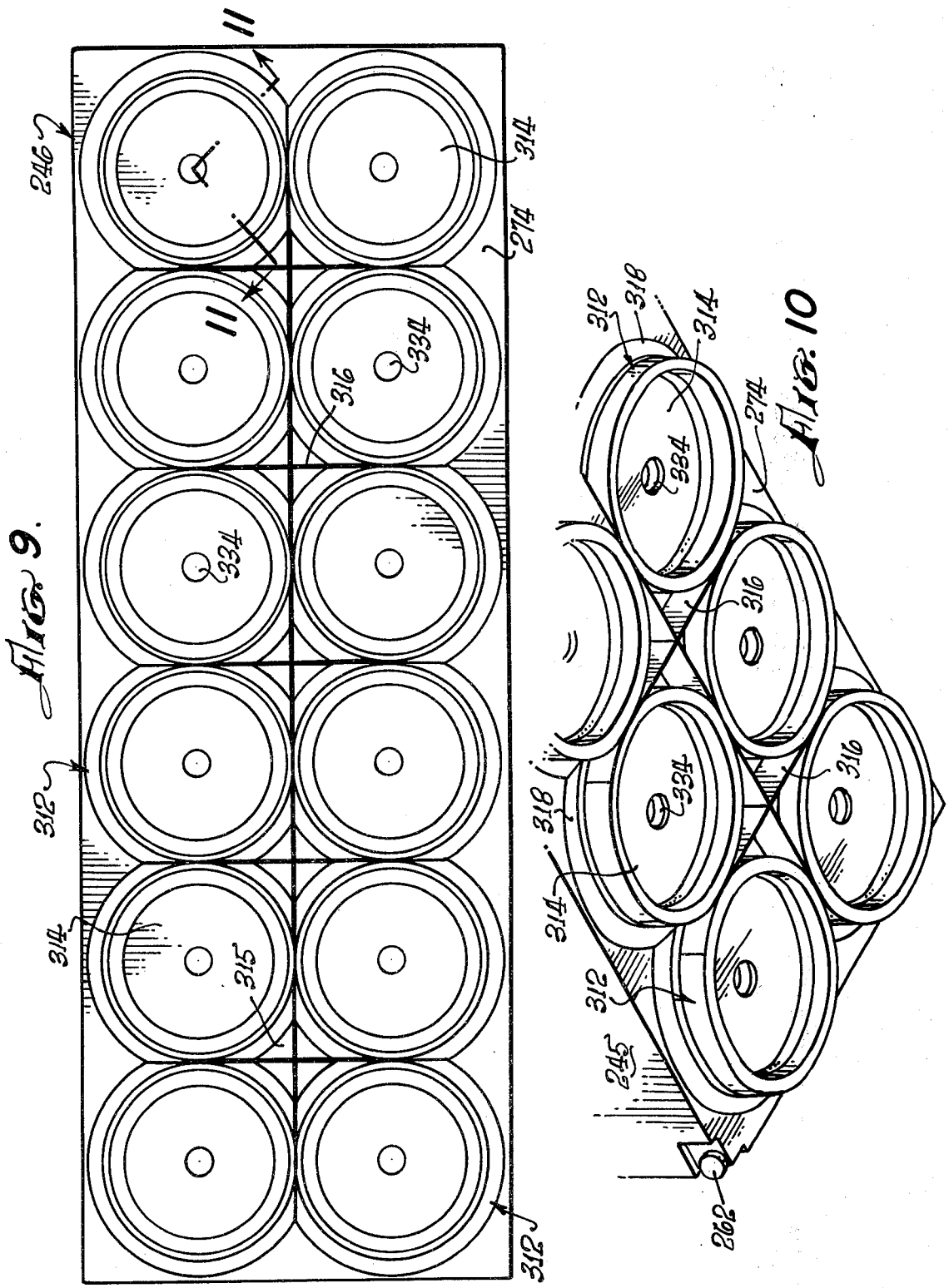

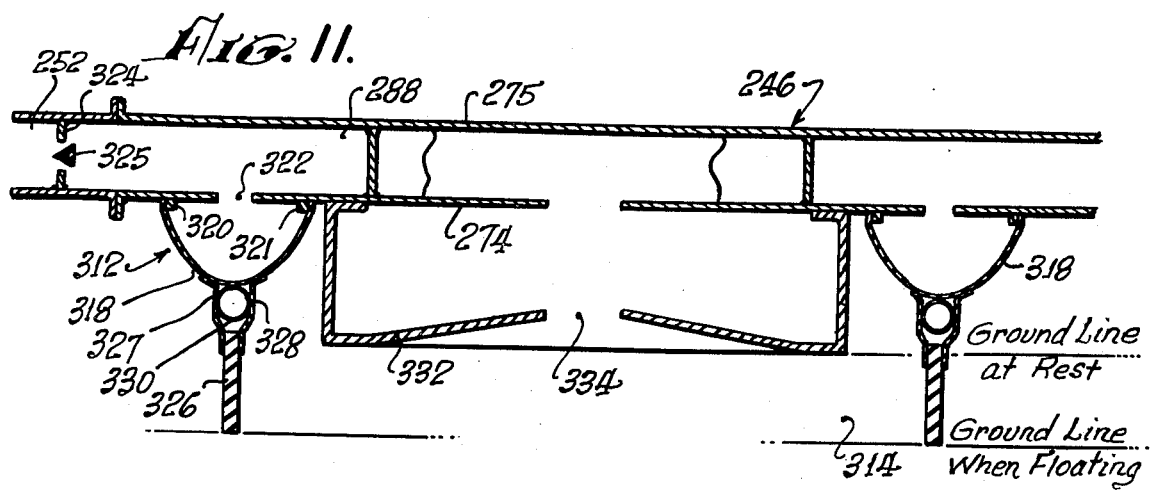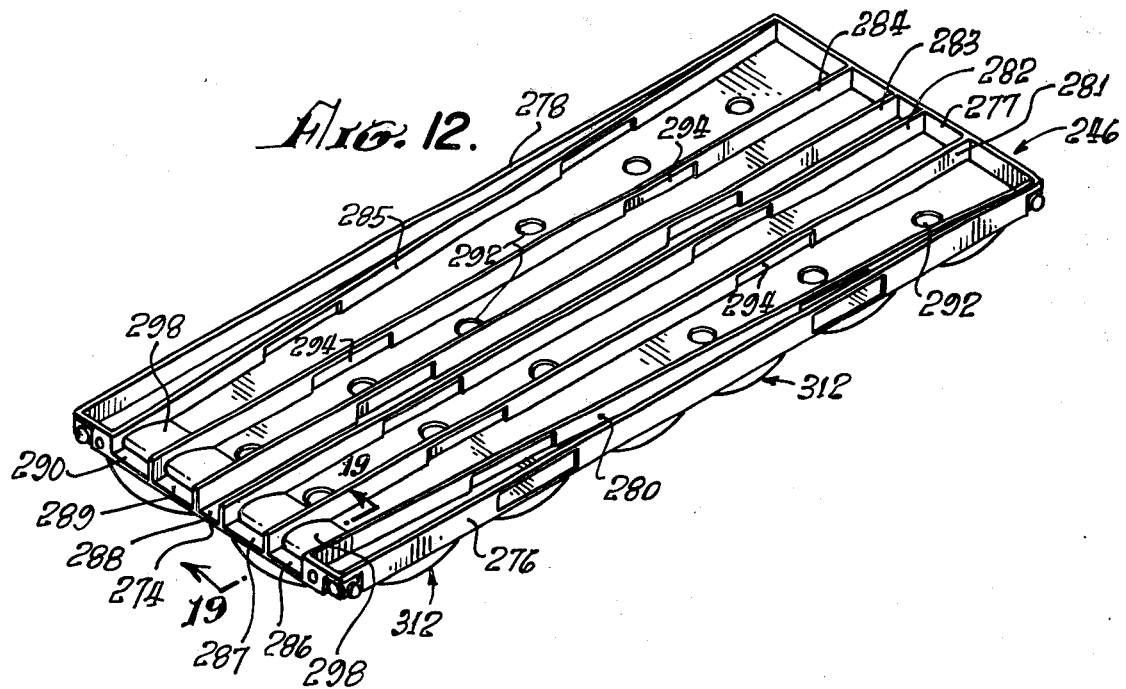

AIR CUSHION CONVEYANCES

BACKGROUND OF THE INVENTION

Various problems need to be solved for the construction of and operation of efficient air-cushion vehicles, for economical and expeditious handling of cargo and for the construction of sealing assemblies to form and confine load-supporting air cushions under various kinds of conveyances.

It has been found that highly satisfactory sealing assemblies for creating air cushions under conveyances may be of the general type disclosed in my U.S. Pat. No. 3,055,446 and in my copending patent application Ser. No. 208,879. Such a sealing assembly comprises an annular inflatable hanger on the underside of a mobile base and annular structure extending downward from the annular hanger into close proximity to the underlying floor or ground. The downwardly extending annular structure typically comprises an annular sealing means cooperative with the floor or ground and resilient annular mounting means suspending the annular sealing means from the inflatable hanger.

SUMMARY OF THE INVENTION

Various annular sealing assemblies are disclosed each of which comprises the basic combination of annular inflatable hanger, annular sealing means to retard peripheral leakage from the air cushion, and annular flexible mounting means suspending the annular sealing means from the underside of the hanger. These combinations incorporate various means to affect the spring rate of the sealing assembly as well as means to damp the oscillations of the sealing assembly. For these purposes the sealing assemblies may variously employ coil springs, leaf springs, flexible skirts, inflated deformable annular chambers, vented deformable annular chambers, solid elastomer components, foamed elastomer components, and hollow elastomer bodies. For damping action, mechanical dashpots may be incorporated in the sealing assemblies or the scuffing action of leaf springs may be used or materials may be selected having inherent damping characteristics for use in various components of the sealing assemblies.

An annular sealing means to cooperate with the floor or ground may be variously in the form of a single annular brush means, dual annular brush means, an annular flexible elastomer skirt, or a smooth surfaced annular wear element. An especially advantageous annular sealing means may comprise brush means in combination with an annular flexible impervious sheet barrier means to discourage air leakage through the brush means. In such a combination the brush means may be in the form of a circumferential series of brush segments arranged end to end that independently follow variations in the surface of the floor or ground, and the impervious sheet barrier means may act in hoop tension to confine the brush segments in their assembled positions.

Any tendency for an annular sealing assembly to be unduly expanded radially or to be otherwise deformed by the fluid pressure of the enclosed air cushion may be prevented by incorporating a rigid ring means in the sealing assembly structure. Such a ring means may be between the annular inflatable hanger and the annular mounting means that suspends the sealing means from the hanger or the ring means may be in or below the annular mounting means.

The various features and advantages of the invention may be understood from the following detailed description and the accompanying drawings.

BRIEF DESCRIPTION OF THE DRAWINGS

In the drawings, which are to be regarded as merely illustrative:

FIG. 1 is a radial cross-sectional view of a low profile sealing assembly;

FIG. 2 is a bottom plan view of the an cushion cargo conveyance;

FIG. 3 is a diametrical cross-sectional view of a high profile annular sealing assembly taken through section 3 — 3 of FIG. 2;

FIG. 4 is a view similar to FIG. 3 showing a different structure;

FIG. 5 is a view similar to FIG. 3 showing another structure;

FIG. 6 is a fragmentary perspective view, partially in cross section, of the brush and hanger assembly shown in FIG. 4;

FIG. 9 is a bottom plan view of an air cushion cargo conveyance;

FIG. 10 is a perspective view of a portion of the bottom of an air cushion supported cargo conveyance;

FIG. 11 is a cross-sectional view taken along the angular line 11 — 11 of FIG. 9 showing the construction of an annular sealing assembly having a skirt type annular sealing means;

FIG. 12 is a cross sectional perspective view showing the internal construction of an air cushion base of a cargo conveyance; and FIG. 1 is a cross section of one type of low profile sealing assembly. The bottom surface of the air cushion pallet 26 is recessed above the sealing assembly to allow the flexible sealing assembly to retract upward into a cavity 75 in the bottom of the pallet. The depth of this cavity is greater than the deflated height of the sealing assembly 70. Thus when no air is being supplied to the air cushion pallet 26 it can rest on its bottom surface 76 without crushing the flexible sealing assembly 70. Since the air cushion pallet in this version rests on its bottom surface when no air is being supplied, no supporting legs or blocks are required under the pallet.

In FIG. 1 the rigid base structure of the air cushion pallet consists of a lower skin 76, an upper skin 78, and an intermediate horizontal partition 80. These three parallel elements are separated by a framework of external solid web beams 82 and a plurality of internal individual spacers 84. This construction produces two plenum chambers inside the air cushion pallet. The upper plenum chamber 85 supplies air to the air cushion underneath the air pallet through an arbitrary number of openings 86. The lower plenum chamber 88 supplies air to the inside of the flexible sealing assembly 70 through an arbitrary number of openings 90. In FIG. 1 the annular sealing means 100 of the sealing assembly 70 is in the form of a low profile annular brush, the annular brush being mounted on the underside of an inflatable hanger 102 by a resiliently compressible means having cylindrical flexible walls 104 and 105 that define an annular chamber 106. The flexible walls 104, 105 may be made of the same material as inflatable hanger 102. The annular chamber 106 is airtight but is in communication with the interior of the hanger 102 through an arbitrary number of small openings 108 in the sheet material of the hanger. The flexibility of the airtight chamber 106 is determined by selection of the width of the chamber 106, the stiffness of the sheet material used for the annular walls 104, 105 and the pressure of the air that is supplied to the chamber from hanger 102.

Figure 7:
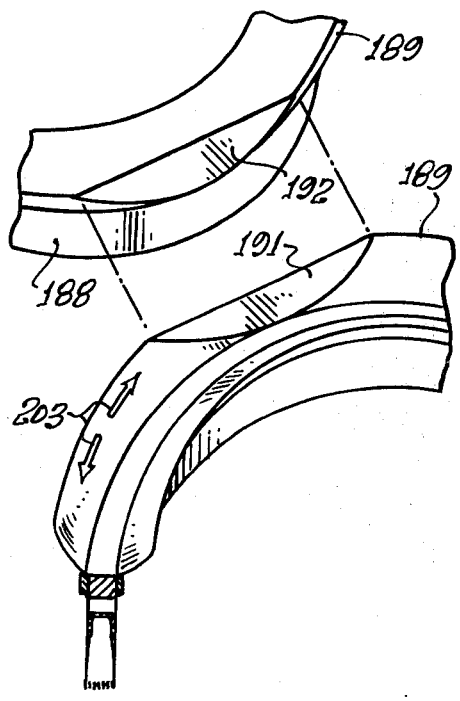
FIG. 7 is a perspective view, partly in section, showing the construction of the annular flexible seal hangers at the tangent points of contiguous annular sealing assemblies.

If an air cushion device such as a pallet 26 is heavily loaded, a dynamic instability may be encountered. This instability produces a high frequency, vertical bounce of the entire air cushion structure and its load. Experiments have demonstrated, however, that this dynamic instability can be effectively controlled by providing a shock-absorbing, resiliently compressible element between the annular sealing means 100 and the annular hanger 102, the shock-absorbing element having a spring rate independent of, and preferably less than, the spring rate of the hanger. In the construction of the sealing assembly 70 shown in FIG. 1 the annular chamber 106 constitutes the desired shock-absorbing resilient compressible element between the annular hanger 102 and the annular sealing means 100.

The low profile annular brush which constitutes the sealing means 100 requires a flat ring or structural header 112 to keep the sealing means from bowing or expanding radially because of the air pressure inside the airtight chamber 106. Nevertheless the sealing means 100 should have the capability of deflecting along its periphery to accommodate rolling variations in the surface of the floor or ground over which it operates. This capability may be provided by dividing the flat ring or structural header 112 into a circumferential series of flexibly interconnected segments.

The inflatable seal hanger 102 of the sealing assembly 70 is mounted by metal clamping rings 114, 115 to the vertical cylindrical walls 116, 117 of an annular cavity on the underside of the pallet. To facilitate quick removal and attachment of the sealing assembly 70, however, the inflatable hanger 102 may be fitted with an inner circumferential zipper 118 and an outer circumferential zipper 120. Since the zippers 118, 120 run around the entire periphery of the hanger 102 they make it possible either to gain access to the interior of the hanger or to remove the hanger without disturbing the clamping rings 114, 115.

FIG. 2 is a bottom plan view of an air cushion cargo conveyance. This conveyance is fitted with a number of openings 184 fitted with hinged doors 185 to supply air to circular sealing assemblies 187 defining separate air cushions under the base. To minimize peripheral leakage from the air cushions these circular sealing assemblies 187 are mounted tangent to each other. Flexible airtight connection is provided between contiguous sealing assemblies 187 and, as shown in FIG. 7, confronting portions of the inflatable hangers 189 of the sealing assemblies 187 are fitted with flat flexible gussets 191, 192 which butt together in airtight juncture at the point of tangency of the sealing assemblies. Therefore, in the sealing assembly geometry shown in FIG. 2, the net peripheral leakage is the peripheral leakage of the sealing assemblies outboard of their points of tangency. The four corner sealing assemblies 187 each has a larger exposed leakage periphery than each of the other sealing assemblies. When sealing assemblies with different exposed leakage peripheries are installed on the same air cushion platform in this manner, the cushions with the greater peripheral leakage require more air flow than those with less peripheral leakage. Experiments have shown this requirement may be satisfied by differentially opening the doors 185 of the openings 184 to vary the effective areas of the openings so that the ratio $$\left[ \frac{\text{effective area of opening which supplies air to cushion}}{(\text{net leakage periphery of that cushion})^2} \right]$$

has the same numerical value for all air cushions on the air cushion platform.

By opening all doors simultaneously floatation air can be admitted to all air cushions simultaneously. Conversely, some doors can be opened wider to supply a greater amount of lifting air to the most heavily loaded air cushions. By this means, wide variations in center of gravity of the load can be accomodated.

FIG. 3 is a cross-sectional view taken through section 3 — 3 of FIG. 2 showing the construction of a sealing assembly 187. The sealing assembly 187 includes a hanger 189 which is attached to the bottom surface 199 of the air cushion base by structural mounting rings 200, 201. The outer circumferential and inner circumferential halves of this flexible hanger are attached along their lower edges to a floating structural ring 202. The hanger 189 is constructed of flexible airtight material which is capable of stretch in only one inch direction as shown by the arrows 203 in the fragmentary perspective view of FIG. 9. This capability of stretching circumferentially makes it possible for the hanger 189 to be attached between mounting rings 200 or 201 of one diameter and the structural ring 202 of a different diameter.

All of the hangers 189 of the various sealing assemblies 187 are inflated through a separate air hose 204a. This air line is fitted with a one-way check valve 205 which allows air to freely pass into the hangers as shown by arrow 206 but prevents air from leaving the hangers. With this arrangement the inflation pressure of the hanger is independent of the pressure in the air cushions under the base 132 of the conveyance 130 and the pressure in the space inside the base from which the air cushions are supplied through the door controlled openings 184. Inlet duct 204a has branches 204b to the various hangers 189 and is equipped with a tee 207 and valve 208. This valve may be opened to allow air trapped inside the various hangers to escape to the atmosphere when the air cushion cargo conveyance is at rest.

In FIG. 3 the annular sealing means 210 at the bottom of the sealing assembly is in the form of a brush with the rigid flat structural header 212. A flexible air barrier 214 is fitted around the outside periphery of the brush and extends from the brush header 212 to the lower ends of the bristles of the brush. This air barrier consists of an arbitrary number of layers of inelastic fabric coated on both sides with flexible, airtight, abrasion-resistant material. The reinforcing fabric inside the air barrier is preferably of open weave to allow the coatings on opposite sides to weld together through the fabric to resist delamination. This air barrier is attached to the bristles of the brush 210 by bonding and stitching through an arbitrary number of rows of lock stitches 215. These lock stitches are preferably made of relatively elastic thread to allow the bristles of the brush to flex freely in the lateral direction when surmounting obstacles.

Figure 8:
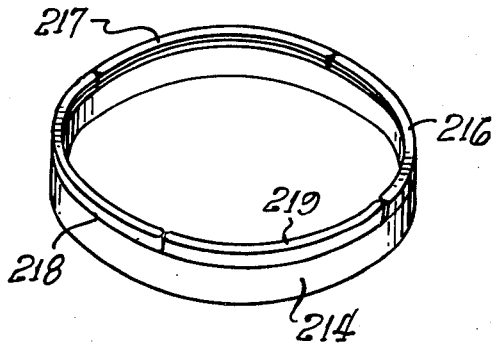
FIG. 8 is a perspective view of an annular brush type sealing means incorporating an outer flexible, airtight, abrasion-resistant air barrier.

As shown in FIG. 8, the brush 210 may consist of an arbitrary number of segments 216, 217, 218, and 219 arranged in a circumferential series with the ends of the consecutive segments butted together. Air barrier 214 provides a continuous hoop which surrounds the circular brush assembly and bridges across the butt junctures of brush ends to provide the only physical connection between individual brush segments. Therefore, the air barrier 214 resists the total hoop tension built up in the circular sealing assembly when the air cushion is created therein.

FIG. 4 shows a modified sealing assembly that may be substituted for the sealing assembly 187 in FIG. 3. In FIG. 4, the annular sealing means at the bottom of the sealing assembly consists of two concentric brush assemblies 220, each of which is similar to the single brush assembly shown in FIG. 3 and each of which has a header 221 of inverted U-shaped configuration. In FIG. 5 which shows another modification of a sealing assembly the annular sealing means at the bottom of the sealing assembly consists of a flat-bottomed wear element 222 which is flexible along its periphery but is relatively stiff across its width.

All three types of annular sealing means shown in FIG. 3, 4, and 5 are attached to some form of a structural ring by flexible mounting means, the structural ring being designated 202a in FIG. 4 and 202b in FIG. 5. In each figure this flexible mounting means consists in part of two vertical flexible curtains. In FIGS. 3 and 4 these curtains may actually be extensions of the hangers 189. The lower edges of these curtains are interconnected by a horizontal web 224 of the same or similar material. In FIG. 5 the two vertical curtains may actually be extensions of the wear element 222.

In each of the inflatable hangers shown in FIGS. 3 and 4 an effective spring rate may be provided by an arbitrary number of mechanical tension springs 225 attached between the bottom surface 199 of the air cushion base and the floating structural ring 202. These springs may have the added function of automatically retracting the sealing assemblies when valve 208 is opened to allow air to escape from the hangers. Damping for the inflatable seal hanger may be provided as shown in FIG. 3 by mounting an arbitrary number of mechanical dampers 226 in the form of dashpots between the bottom surface 199 of the air cushion base and the floating structural ring 202.

In the sealing assembly configuration shown in FIG. 3, the only connection between the brush-type sealing means 210 and the floating structural ring 202 consists of the flexible curtains which are extensions of the seal hanger 189. The effective spring rate of the curtains is due to their own elasticity. Effective damping of the flexible airtight chamber 228 between the brush-type sealing means 210 and the inflatable hanger 189 is provided by drilling a selected number of small diameter holes 230 through the structural ring 202. These orifices allow air to pass between airtight chamber 228 and the interior of the inflatable hanger but resist such passage of air in proportion to the velocity of movement of the brush-type sealing means 210 relative to the structural ring 202.

The sealing assembly shown in FIG. 4 includes leaf springs 232. As best shown in FIG. 6, a plurality of leaf springs 232 are inside airtight chamber 234 between the dual headers 221 of the double brush sealing means 220 and the floating structural ring 202a. It is to be noted that ends of the leaf springs 232 rub or scuff on the upper surfaces of the headers 221 to provide damping of motion of sealing means 220 relative to ring 202a. Additional damping of the flexible air chamber 234 may be provided by a number of vent orifices 235 in the outer wall of the flexible air chamber. These vent orifices allow air to pass between the airtight chamber 234 and the atmosphere but resist such passage of air in proportion to the velocity of movement of the double brush air seal 220, relative to floating structural ring 202a.

In the sealing assembly configuration shown in FIG. 5, the sealing means or wear element 222 is attached to the structural ring 202b by two flexible vertical curtains which may actually be extensions of the inner and outer edges of the wear element. The space between the wear element 222 and the structural ring 202b may be filled with resilient sponge or foam material 236 which allows the sealing means of wear element to deflect relative to the rigid structural ring 202b to conform to local variations in the surface over which the air cushion supported device is operated. The enclosed cavity between the wear element 222 and the structural ring 202b may be vented to the air cushion inside the sealing assembly through a selected number of small orifices 238. These orifices allow air to pass between the airtight flexible chamber filled with resilient foam 236 and the air cushion but resist such passage of air in proportion to the velocity of movement of the wear element 222 relative to floating structural ring 202b. Therefore, this construction produces effective damping between the air seal and the structural ring in addition to the inherent damping of flexible foam material 236.

In the sealing assembly configuration shown in FIG. 5, structural ring 202b is attached to the inflatable hanger 189 by two flexible vertical curtains. The space between the structural ring 202b and the inflatable hanger 189 may be filled with resilient sponge or foam material 240 which allows the rigid structural ring 202b to deflect relative to the inflated hanger 189. The structural ring 202b can therefore tilt to follow rolling variations in the surface over which the air cushion supported device is operated without having to deflect the inflated hanger 189. The enclosed cavity between structural ring 202b and the inflatable hanger 189 may be vented to the air cushion inside the sealing assembly through a selected number of small orifices 242. These orifices allow air to pass between the airtight flexible chamber filled with the resilient foam material 240 and the air cushion but resist such passage of air in proportion to the velocity of movement of structural ring 202b relative to the hanger 189. Therefore, this construction produces effective damping between the floating structural ring 202b and the seal hanger in addition to the inherent damping of the flexible foam material 240.

Since the sealing assemblies shown in FIGS. 3, 4, and 5 are assembled below the bottom surface 199 of the air cushion base, means must be provided to prevent the dead weight of the air cushion cargo conveyance from crushing the sealing assemblies when no air is being supplied to the air cushions. As shown in FIG. 3, structural beams 244 are formed into closed circles and mounted to the bottom surface 199 of the air cushion base inside the sealing assemblies. The depth of these beams is at least as great as the collapsed height of the sealing assemblies as shown in FIG. 3.

FIG. 12 is a cross sectional perspective view showing the internal construction of the air cushion base of the cargo conveyance. The base structure consists of a lower flat plate 274 and a parallel upper flat plate 275 (FIG. 11), the upper flat plate also forming the cargo floor of the conveyance. These plates are separated by a framework of external solid beams 276, 277, 278 and a series of internal solid web beams 280, 281, 282, 283, 284, and 285. These internal beams run longitudinally of the length of the base structure and divide the interior into five separate air ducts 286, 287, 289, and 290 as shown in FIG. 12. The center air duct 288 supplies air to inflate the flexible hangers of the sealing assembly as will be described. Each of the other four ducts supplies floatation air to one quarter of the air cushions under the cargo conveyance. Floatation air passes into the air cushions through holes 292 in the lower plate 274 of the base 246.

It will be noted that air ducts 286 and 290 supply floatation air to the cushions which are located fartherest from the air inlet. To prevent excessive pressure drop in the floatation air traveling over this distance, beams 280 and 285 are canted outward causing the width of air ducts 286 and 290 to be greater at the far end of the base than at the air inlet end.

It would generally be desirable to minimize the vertical spacing between the lower plate 274 and the upper plate 275 because the volume occupied by this base structure represents lost cargo space in the van conveyance. However, this space must accommodate the flow of floatation air as described above and must also provide the pockets 266 for the tines of forklift trucks. These requirements can be satisfied by placing hinged airtight doors 294 in the internal beams 280, 281, 282, 283, 284, 285. These doors are placed in the path of each fork tine and will be pushed out of the way by the tines as they are inserted. The doors 294 are spring loaded to closed position so that when the fork tines are withdrawn the doors snap shut to prevent crossflow of air between adjacent air ducts and to prevent leakage of air to the atmosphere.

FIG. 9 is a bottom plan view of base 246 of an air cushion cargo conveyance. This base 246 is fitted with a number of circular sealing assemblies 312 defining separate air cushions 314 under the base. To minimize peripheral leakage, these circular sealing assemblies are mounted tangent to each other with flexible, airtight connection provided between adjacent sealing assemblies at their points of tangency. FIG. 10 is a perspective view of some of the sealing assemblies. As shown in this figure the sealing assemblies 312 are cylindrical and are tangent along their perpendicular surfaces.

During operation, the sealing assemblies 312 fill with floatation air at relatively high pressure. Some of this floatation air then bleeds under the portions of the sealing assemblies 312 that face toward the longitudinal center of the base and fills the internal cavities 315 that are formed by the tangentially arranged assemblies.

When air pressure inside the internal cavities 315 equals the air pressure of the air cushions 314 there is no pressure differential across the inwardly facing portions of the sealing assemblies 312. However, there is a substantial pressure differential across the portions of the sealing assemblies 312 that face outwardly of the base 246. The result is a net horizontal pressure-generated force field on each sealing assembly 312 that tends to push it outward away from the longitudinal central region of the base. Depending on the vertical height of the cylindrical sealing assemblies 312 and the air pressure in the cushions 314 this horizontal force field can assume substantial magnitude. Under these conditions, it is desirable to interconnect the tangent points of all the sealing assemblies with flexible tension ties 316. These tension ties can be made of the same material as the flexible air barriers which comprise part of each sealing means that cooperates with the floor or ground beneath the sealing assemblies. Thus the tension ties wear down in use along with the lower annular sealing means of the sealing assemblies.

FIG. 11 is a cross-sectional view taken through one of the air cushions of FIG. 9 showing the construction of the sealing assemblies. A flexible inflatable hanger 318 is attached to the bottom surface plate 274 of the air cushion base by structural mounting rings 320, 321. The airtight inflatable hanger 318 is inflated through orifices 322 which communicate with air duct 288 in the base 246 of the air cushion conveyance 245. Air is supplied to air duct 288 by a matching duct in a removable air inlet manifold 252. A fragmentary cross-sectional view of this portion of manifold 242 is shown in FIG. 11. An airtight barrier 324 is mounted across the portion of the air inlet manifold which supplies air to air duct 288 and this barrier is fitted with a one-way check valve 325. When inlet manifold 252 is attached in airtight juncture to base 246, this one-way check valve operates to allow air to pass freely into air duct 288 and from there to orifices 322 into inflatable hangers 318. However, check valve 325 prohibits reverse air flow from air duct 288 back into the air inlet manifold 252. This arrangement makes it possible to inflate the hangers 318 to a different pressure than the air cushion. When the inlet manifold 252 is removed from the base 246, the hangers 318 deflate immediately to remove downward pressure on the sealing means there below when the air cushion conveyance is at rest.

The effective spring rate of an inflated seal hanger 318 is determined by elasticity of the material from which it is fabricated, by air pressure inside the hanger, and by the geometry of the hanger. The hanger is wider across its top where it is attached to plate 274 than it is across its lower extremity where it is attached to the annular sealing means. As a result, the force required to push the sealing assembly upward increases as the annular sealing means under the hanger approaches the bottom surface of the plate 274. Therefore, this geometry of a hanger 318 produces an effective spring rate for the hanger. The orifices 322 allow air to pass between the interior of a hanger 318 and air duct 288 but resists passage of air in proportion to the velocity of movement of the sealing means relative to the base of the air cushion conveyance. Therefore, this construction produces effective damping of the inflatable hanger.

In FIG. 11 the annular sealing means under the inflatable hanger 318 consists of a flexible skirt 326 attached to the hanger 318 by flexible mounting means. In this instance the flexible mounting means consists of two flexible curtains 327, 328. In FIG. 11, the spring rate of the flexible mounting means is increased by placing a round, hollow, flexible tube 330 between the annular sealing means or skirt 326 and the hanger 318. In FIG. 11 the effective damping between the annular sealing means 326 of the hanger 318 is provided by structural damping of the flexible curtains 327, 328 and the flexible hollow tube 330.

Since the sealing assemblies 312 are suspended below the bottom surface of plate 274 of the air cushion conveyance, means must be provided to prevent the dead weight of the conveyance from crushing the sealing assemblies when no air is being supplied to the air cushions. As shown in FIG. 11, a circular pan 332 is mounted inside each air cushion. The vertical depth of this pan is at least as great as the collapsed height of the sealing assembly 312. The bottom surface of pan 332 is preferably concave upward toward the center where feed hole 334 is provided to allow floatation air to enter the air cushion area that is surrounded by the sealing assembly.

I claim:

1. In a fluid cushion device of the plenum chamber type capable of supporting a superimposed load of high magnitude wherein a sealing assembly extending downward from a load-bearing base to confine a fluid cushion comprises an annular inflatable hanger projecting from the base and annular structure projecting from the hanger to close proximity to the underlying support surface over which the device operates and wherein sealing means is incorporated in said annular structure in the lower portion thereof to retard escape of fluid from the cushion, the improvement comprising:
said sealing means including brush means with the bristles thereof directed towards the underlying support surface; and
at least one barrier of flexible sheet material enclosing the brush means to minimize leakage from the fluid cushion through the bristles of the brush means.

2. An improvement as set forth in claim 1 which includes stitching connecting the barrier to the bristles of the brush means.

3. An improvement as set forth in claim 2 in which the stitching comprises elastic thread.

4. An improvement as set forth in claim 1 which includes adhesive bonding connecting the barrier to the bristles of the brush means.

5. An improvement as set forth in claim 1 in which the sheet material of the barrier encompasses the bristles of the brush means and acts under hoop tension to oppose radial deformation of the brush means by the pressure of the fluid cushion.

6. An improvement as set forth in claim 5 in which said brush means comprises a circumferential series of brush segments arranged end to end and in which said barrier provides the sole structural means to oppose radial deformation of the brush means by the pressure of the fluid cushion.

7. An improvement as set forth in claim 1 in which the sealing means comprises two concentric brush means and two corresponding barriers surrounding and reinforcing the two brush means respectively.

8. An improvement as set forth in claim 1 in which said annular structure includes a rigid ring to oppose radial expansion of the annular structure in the region above the sealing means but below the inflatable hanger.

9. An improvement as set forth in claim 8 which includes compressible leaf spring means interposed between the rigid ring and the sealing means.

10. An improvement as set forth in claim 8 which includes a resiliently deformable chamber with flexible inner and outer circumferential walls interconnecting the rigid ring and sealing means, said ring having apertures therethrough placing said chamber in communication with the interior of the inflatable hanger.

11. An improvement as set forth in claim 10 which includes a series of compressible leaf springs in said chamber acting between the rigid ring and the sealing means.

12. An improvement as set forth in claim 1 in which the sheet material of the barrier comprises inelastic fabric impregnated with flexible, airtight, abrasion-resistant material.

13. An improvement as set forth in claim 1 in which the sheet material of the barrier comprises inelastic fabric coated on at least one side with flexible, airtight, abrasion-resistant material.

14. In a fluid cushion device of the plenum chamber type wherein a sealing assembly extending downward from a load-bearing base to confine a fluid cushion comprises an annular inflatable hanger projecting from the base and annular structure projecting from the hanger to close proximity to the underlying support surface over which the device operates and wherein sealing means is incorporated in said annular structure in the lower portion thereof to retard escape of fluid from the cushion, the improvement comprising:
said hanger having inner circumferential and outer circumferential walls of flexible sheet material;
at least one of said walls being divided into an upper section and a lower section;
said two sections being releasably interconnected by zipper means.

15. An improvement as set forth in claim 14 in which both of said walls are divided into upper and lower sections releasably interconnected by zipper means whereby the sealing assembly is releasably connected to the load-bearing base.

16. In a fluid cushion device of the plenum chamber type wherein a sealing assembly extending downward from a load-bearing base to confine a fluid cushion comprises an annular inflatable hanger projecting from the base and annular structure projecting from the hanger to close proximity to the underlying support surface over which the device operates and wherein sealing means is incorporated in said annular structure in the lower portion thereof to retard escape of fluid from the cushion, the improvement comprising:
said sealing means being in the form of a flexible skirt with the flexible skirt attached to the annular inflatable hanger by an annular chamber having inner and outer circumferential flexible walls of sheet material;
and an elastomer tube enclosed by the chamber.

17. In a fluid cushion device of the plenum chamber type wherein a sealing assembly extending downward from a load-bearing base to confine a fluid cushion comprises an annular inflatable hanger projecting from the base and annular structure projecting from the hanger to close proximity to the underlying support surface over which the device operates and wherein sealing means is incorporated in said annular structure in the lower portion thereof to retard escape of fluid from the cushion, the improvement comprising:

said annular structure including a rigid ring in the lower region thereof to oppose radial expansion of the annular structure in the region of the sealing means;

a resiliently deformable annular chamber with flexible inner and outer circumferential walls interconnecting said ring and the sealing means;

said chamber containing a mass of foamed elastomer.

18. In a fluid cushion device of the plenum chamber type wherein a sealing assembly extending downward from a load-bearing base to confine a fluid cushion comprises an annular inflatable hanger projecting from the base and annular structure projecting from the hanger to close proximity to the underlying support surface over which the device operates and wherein sealing means is incorporated in said annular structure in the lower portion thereof to retard escape of fluid from the cushion, said improvement comprising:

said annular structure including a rigid ring in the lower region thereof to oppose radial expansion of the annular structure in the region of the sealing means;

an upper resiliently deformable annular chamber with flexible inner and outer circumferential walls interconnecting the ring and the inflatable hanger;

a lower resiliently yieldable annular chamber with flexible inner and outer circumferential walls below the rigid ring;

both of said chambers containing a mass of resiliently yieldable material in the form of cellular elastomer.

* * * * *